United States Patent Office 2,899,926
Patented Aug. 18, 1959

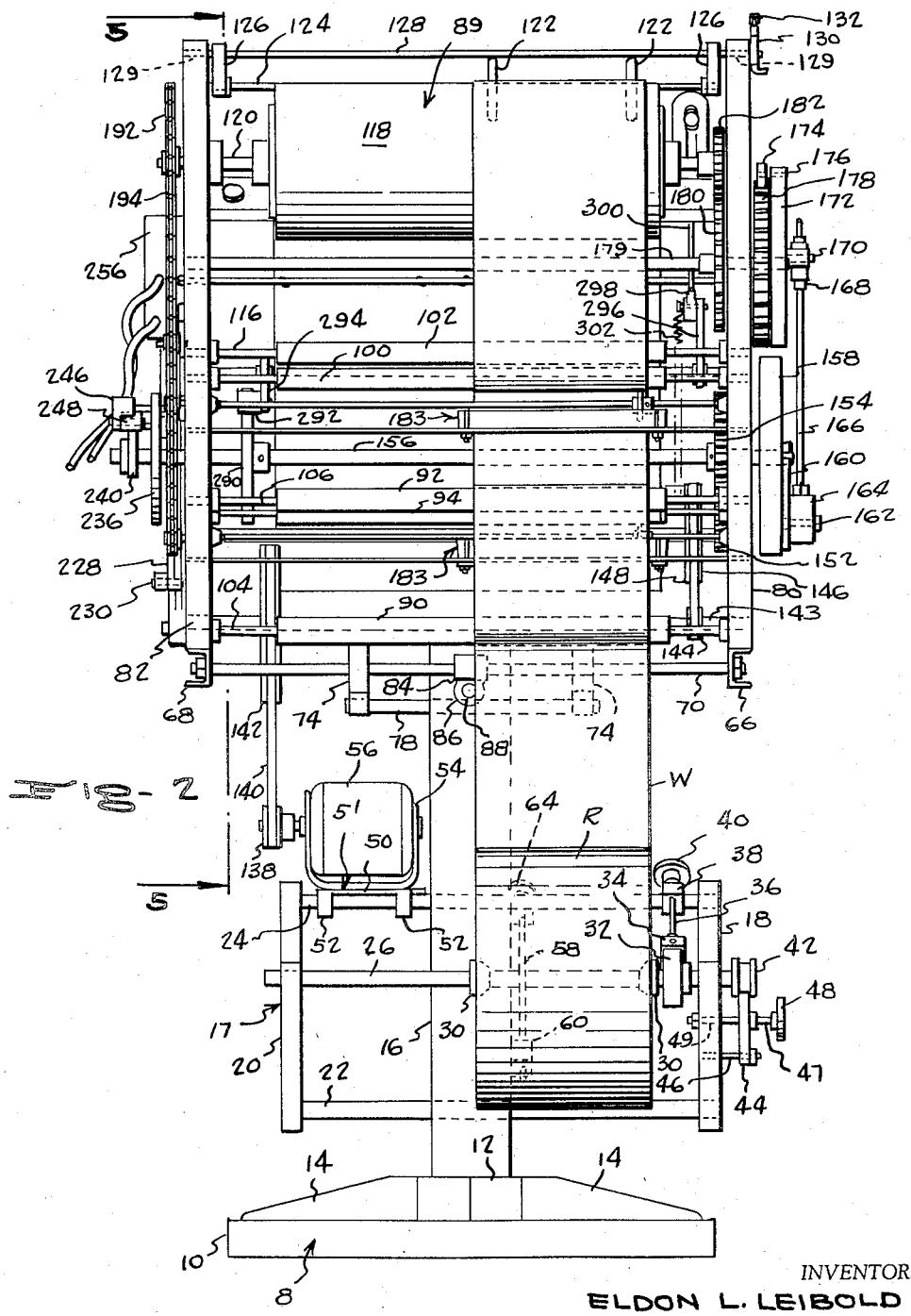

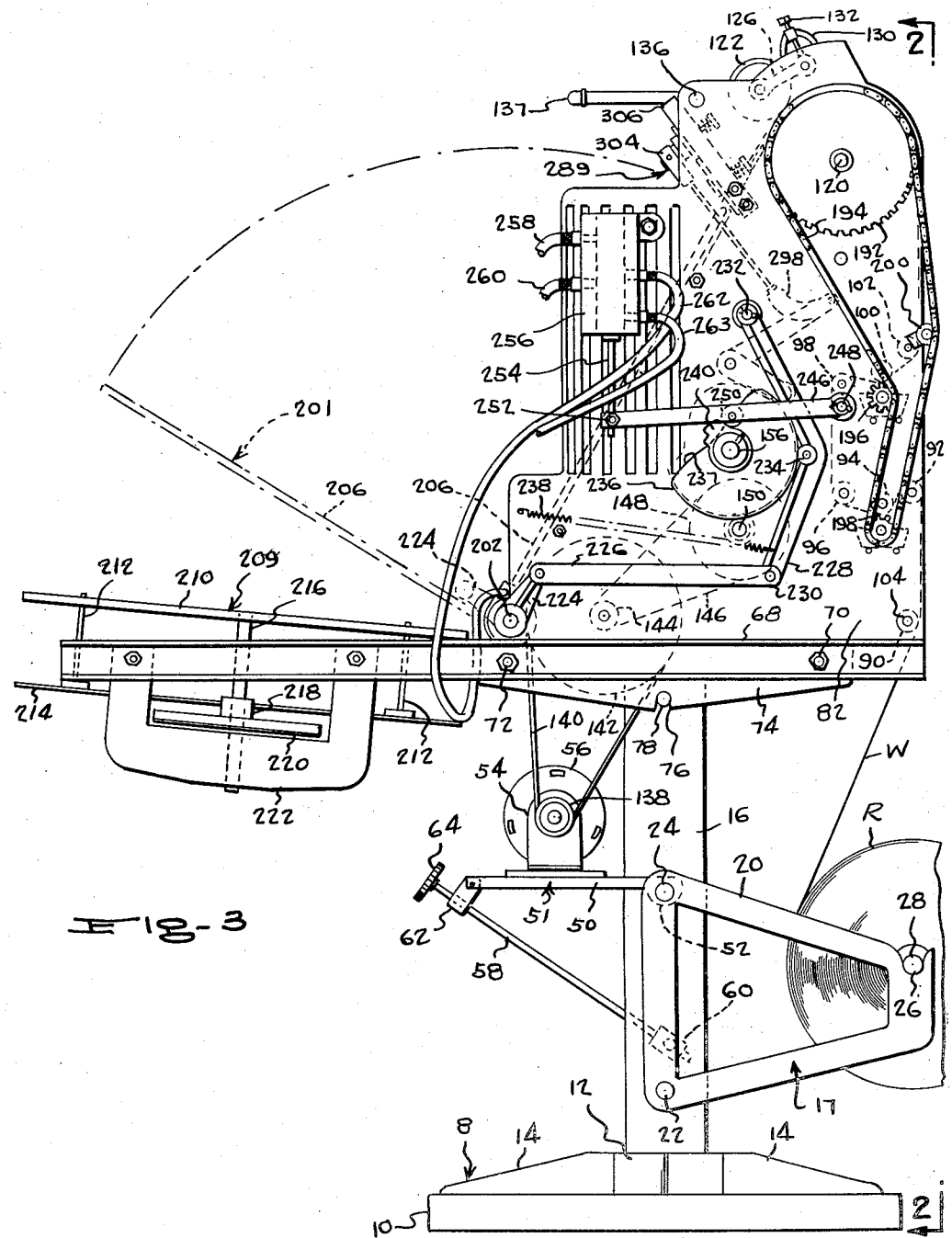

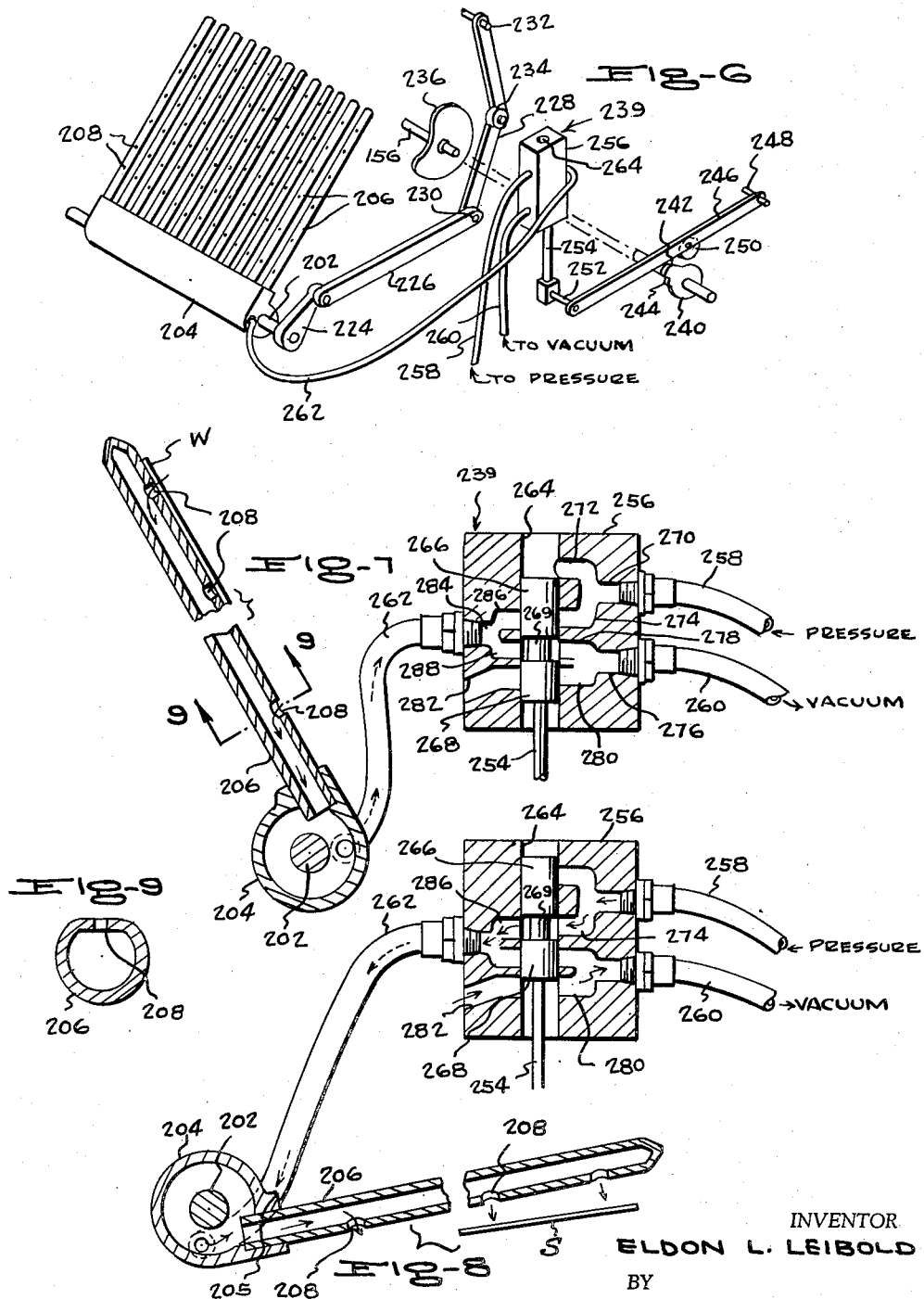

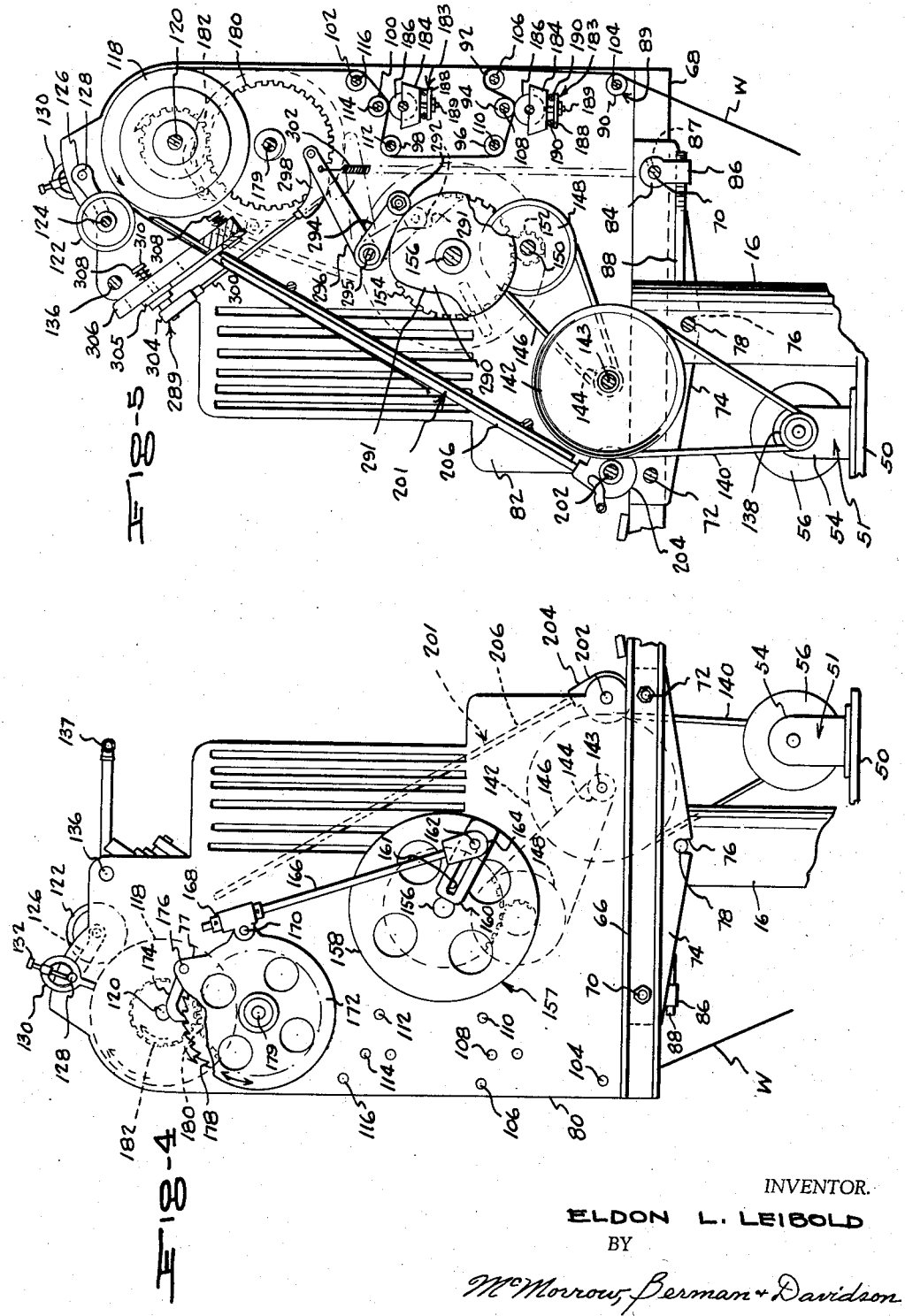

2,899,926

APPARATUS FOR EDGE-GLUING, CUTTING, AND STACKING CARBON PAPER FROM ROLL CARBON STOCK

Eldon L. Leibold, Clanton, Ala.

Application August 9, 1957, Serial No. 677,366

18 Claims. (Cl. 118—41)

This invention relates to apparatus to be used in the manufacture of carbon-interleaved business forms. More particularly, the invention has reference to apparatus that is used for gluing a selected edge of carbon paper stock to be fed from roll carbon, said apparatus being further designed to cut the stock to a selected length and stack the same, thus preparing the carbon paper for subsequent interleaving operations in producing the completed business forms.

The interleaving of single-use carbon, in business forms, is of course quite common, and is a conventional feature of order pads, sales books, fan-folded order forms, and many other business forms requiring an original and one or more copies.

Heretofore, the edge-gluing of the carbon, to permit the same to be interleaved with adjacent papers, and the cutting of the carbon to selected lengths, has presented certain problems, and has been a relatively expensive and time-consuming operation, carried out on complex machinery, with flat stock as distinguished from stock fed from a roll in a continuous web.

Despite the relative complexity of the machinery which has heretofore been employed, said machinery has had the disadvantage that it has not been adaptable to the desired extent, for use on carbon of different widths and lengths. Further, said machinery has had the disadvantage that the complexity thereof tends to cause frequent break-downs. As is well known, "down time" for any machine used in mass production operations results in considerable losses so far as the manufacturing company is concerned, and therefore, it is one important object of the present invention to provide a highly simplified machine which will accomplish the above stated, desirable results, while still having marked versatility as regards the wide range of widths and lengths in which carbon paper can be manufactured for interleaving purposes, despite its being fed from a conveniently handled, continuous roll.

Another object is to provide, in apparatus of the type described, a novel variable feed mechanism, designed for timed advancement of the continuous web, to produce finished stock of a selected length, within a wide range of lengths.

A further object is to provide a novel vacuum-operated fly delivery assembly, operating in timed relationship to the feeding and cutting mechanisms, and designed to assure the proper placement of the carbon paper, both before and after cutting of the web.

Another object is to provide, in apparatus of the character stated, a highly effective knife or guillotine mechanism, operating to efficiently cut the web at predetermined intervals.

Yet another object is to provide a machine of the character described which will be novelly designed in a manner to constitute a general improvement, from the standpoint of the entire operation discharged thereby, over machines previously conceived for the same general purpose.

Other objects will appear from the following description, the claims appended thereto, and from the annexed drawing, in which like reference characters designate like parts throughout the several views, and wherein:

Figure 2 is a rear elevational view thereof, on a scale enlarged above that of Figure 1, illustrating the machine as seen from the left of Figure 1;

Figure 3 is a side elevational view of the apparatus, a portion of the roll carbon stock being broken away, the fly delivery being shown in dash-dotted and chain-dotted lines in different positions to which it is shiftable, the machine being seen from the left of Figure 2, thus to show the side of the machine opposite that seen in Figure 1;

Figure 4 is a fragmentary side elevational view of the machine, illustrating the side opposite that seen in Figure 3, that is, showing the side seen in Figure 1 with the machine being viewed from the right of Figure 2;

Figure 5 is a vertical sectional view through the machine substantially on line 5—5 of Figure 2, on the same scale as Figure 2;

Figure 6 is an exploded perspective view of the fly delivery mechanism per se;

Figure 7 is an enlarged vertical sectional view through said fly delivery mechanism and the associated valve structure, in the retracted position of the mechanism;

Figure 8 is a view like Figure 7 in which the fly delivery mechanism is in its advanced position; and Figure 9 is a still further enlarged, transverse sectional view through one of the fingers of the fly delivery mechanism, substantially on line 9—9 of Figure 7.

Figure 1:
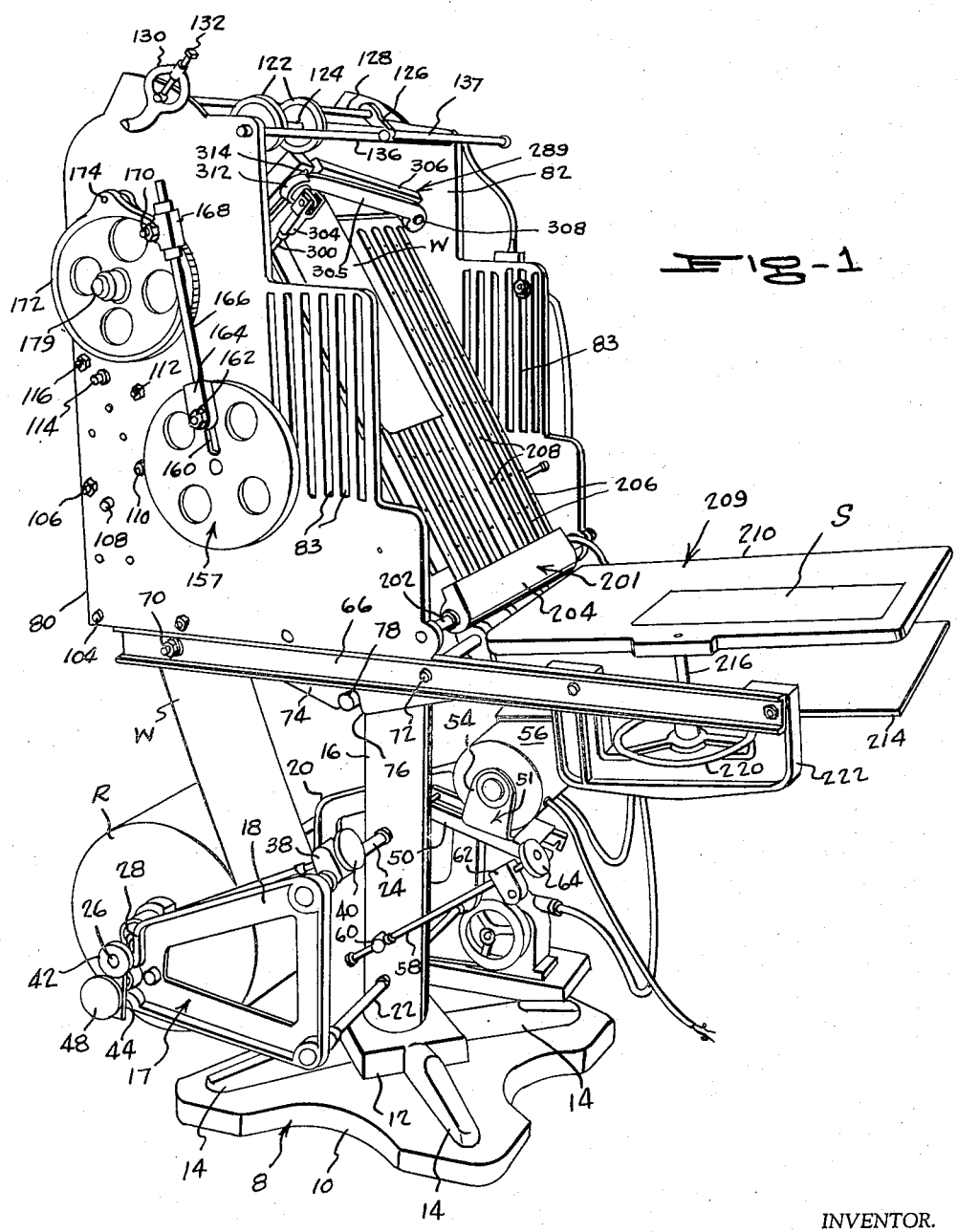
Figure 1 is a perspective view of a machine according to the present invention.

Referring to the drawing in detail, designated generally at 8 is a support structure or frame of the apparatus, including a flat, weighted base 10 capable of fixed connection to a floor surface if desired. Integrally formed on base 10 is an upwardly projecting center boss 12, from which radiate integral reinforcing ribs 14. Center boss 12 has an upwardly opening, centrally disposed socket receiving the lower end of an upwardly projecting post or standard 16, which may be fixedly engaged in the socket in any suitable manner.

A roll carbon support assembly 17 includes open-center, flat rack frames 18, 20 spaced laterally outwardly from opposite sides of the center post 16, as clearly shown in Figure 2. Rack frames 20 lie in vertical planes, and are progressively reduced in height in a direction rearwardly from the standard as clearly shown in Figure 3. The rack frames, at their forward corners, are secured fixedly to the ends of horizontal support bars 22, 24 that extend through the column or standard 16 in perpendicular relation to the length of the standard.

The upper rear corners of rack frames 20, 22 have upwardly opening, flaring notches 28, which rotatably bear the ends of a roll support shaft 26. Referring to Figure 2, individually adjustable upon shaft 26 in a direction longitudinally thereof are opposite but identical, tapering chucks or collars 30 engaging in opposite ends of the core of a roll R of roll carbon stock, from which extends a web W.

The invention is designed for operating on roll carbon of any width within a range extending from two to seventeen inches, hence the provision of the independently adjustable chucks or collars 30, which not only locate the roll at any selected location along the length of the shaft 26, but also are adjustable as to the spacing between the chucks, according to the width of the particular roll.

The roll support assembly 17 further includes a tension control means designed to maintain the web under a selected tension, as it is fed from the roll R. Said means comprises a brake and brake shoe, including a drum 32 secured to shaft 26 for rotation therewith (Figure 2), a brake shoe 34 frictionally engaging the periphery of the drum, a brake shoe support rod 36 extending at an incline forwardly upwardly from shaft 26, a block 38 mounted on bar 24 and having a threaded bore in which rod 36 is threadedly engaged, and a hand wheel 40 secured to the rod 36 for rotating the same. By reason of this arrangement, it is apparent that the brake shoe can be adjusted toward and away from the brake drum, so as to frictionally bear against the drum with a selected amount of pressure, thereby to correspondingly control the tension with which the web is fed from the drum.

Assembly 17 further includes means for effecting adjustments of the rolls toward the left or right in Figure 2, that is, transversely of the apparatus, to a selected position. To this end, there is provided a peripherally grooved collar 42, in the groove of which bears (Figures 1 and 2) a guide plate 44, having a lower end freely slidable upon a guide pin 46 projecting laterally outwardly from rack frame 18 in parallel relation to shaft 26.

The guide plate 44, intermediate its upper and lower ends, has a transverse, threaded opening, in which is threadedly engaged an adjusting stem 47, having at its outer end a hand wheel 48, said stem at its inner end being smooth-surfaced and being rotatably engaged or swiveled in an opening 49 of the rack frame.

Transversely spaced motor support arms 50 constitute part of a motor support assembly generally designated 51. At the rear ends of arms 50, there are integrally formed thereupon laterally spaced, depending bearing sleeves 52, rotatably supported upon bar 24 for vertical swinging movement of the arms 50 about a horizontal axis extending transversely of standard 16.

Mounted upon arms 50 is a U-shaped motor support bracket 54, carrying a motor 56.

For effecting swingable adjustment of the arms 50, the motor support assembly 51 further includes an elongated combination bracket support and positioning rod 58, the lower end of which is axially shiftable and rotatable in a block 60 pivoted on standard 16 to swing about an axis paralleling that of arms 50. Adjacent its upper end, rod 58 is threadedly engaged in a block 62 pivotally connected to the outer or forward end of one of the arms 50, and for convenience in rotating the rod, there is provided a hand wheel 64 on the upper end thereof. By rotation of the rod 58 in a selected direction, the arms 50 are adjusted upwardly or downwardly and are supported by the rod in the selected position of adjustment.

Constituting a part of support structure 8 are elongated, channeled side frame bars 66, 68 spaced laterally outwardly from opposite sides of standard 16 at the upper end of the standard. Referring to Figures 2 and 5, connected between bars 66, 68, in positions respectively spaced rearwardly and forwardly of standard 16, are cross bars 70, 72 respectively, passing through openings formed in the ends of fulcrum plates 74 spaced laterally outwardly from opposite sides of standard 16 as clearly shown in Figure 2. Plates 74 are progressively decreased in height in a direction from their midlength points to their opposite extremities, and formed in the midlength portions of the plates are downwardly opening bearing notches 76, receiving the opposite ends of a fulcrum or supporting bar 78.

Fixedly secured to and projecting upwardly from the respective side frame bars 66, 68 are vertical, side frame plates 80, 82 respectively, having stepped forward edges which, as shown in Figure 1, may be formed with groups of vertical slots 83 if desired, to aid in visibility of the mechanism without loss of strength of the support structure.

Referring to Figure 5, rotatable upon the rear cross bar 70 is a sleeve 84 integral with and arranged at right angles to a sleeve 86, in which is threadedly engaged a stem 88, having a forward end bearing against the back surface of standard 16. Sleeve 84 has a set screw 87 or equivalent means to fix the sleeve to the cross bar 70 in selected positions to which the sleeve is rotated when the stem is adjusted. In this way, the side frame bars 66, 68, the plates 80, 82 carried thereby, and the mechanism confined between the plates and carried by the plates can be rocked to a slight degree about the fulcrum defined by bar 78, and can be maintained in any selected position to which they are so rocked.

The parts 66–88 inclusive all constitute components of the support structure generally designated 8.

Designated generally at 89 is a web advancing assembly. This is shown to particular advantage in Figure 5, and also in Figure 2. Said assembly includes a plurality of rollers about which the web is tensioned and guided, said rollers being designated at 90, 92, 94, 96, 98, 100, and 102 respectively, with each roller extending a major part of the distance between side frame plates 80, 82 as best shown in Figure 2. The web, extending upwardly from roll R, is initially trained about roller 90, and then about the remaining rollers. The rollers are freely rotatable upon guide roller support shafts 104, 106, 108, 110, 112, 114, and 116 respectively, connected between the side frame plates 80, 82.

Assembly 89 further includes a large diameter feed drum 118 secured to a feed drum support shaft 120 for rotation therewith, said shaft being journalled at its ends in the side frame plates. Assembly 89 still further includes a pair of pull rollers 122, having set collars which can be bound against a shaft 124 extending transversely between the side frame plates, so as to secure the pull rollers to said shaft 124 for rotation conjointly therewith, in selected positions to which the rollers are adjusted longitudinally of the shaft. The rollers are in peripheral contact with and are rotated by the feed drum 118, with shaft 124 being carried by the forward ends of forwardly declining arms 126, the rear ends of which receive a pull roller support bar 128, said arms being secured to the bar 128 for rotation therewith. Bar 128 can be bound, in selected positions to which it is rotated, within the openings 129 provided therefor (Figure 2) in side frame plates 80, 82, through the provision of a shaft lock in the form of a ring 130 having a threaded opening. The shaft lock further includes a stem 132 threaded in said opening and adapted to bear against shaft 128, to force the shaft against the ring. The ring is fixedly secured to side frame plate 80.

This completes the construction of the web-advancing assembly 89.

Reinforcing the framing plates is a cross bar 136 extended between said framing plates forwardly of the pull rollers 122, and providing a guard forwardly of said bar 136 is a guard bar 137 which is of L-shape, having an outer leg paralleling bar 136 and spaced forwardly from the bar, and an inner leg fixedly secured to the bar 136. These components constitute part of the support structure 8.

A drive means generally designated at 139 includes a small drive pulley 138 secured to the shaft of motor 56 (see Figure 5). Trained about and extending upwardly from pulley 138 is a belt 140, trained about a larger pulley 142 secured to a shaft 143 journalled in and extending transversely between side frame plates 80, 82. Secured to shaft 143 is a small pulley 144 about which is trained belt 146, trained also about larger pulley 148 secured to shaft 150 for rotation therewith. Small pinion 152 rotates with shaft 150, and is in mesh with larger gear 154 (Figures 2 and 5), secured to and rotating with shaft 156 journalled in and extending between side frame plates 80, 82.

Driven by the drive means 139, said drive means constituting the components 138–156 inclusive, is a variable feed mechanism generally designated at 157 and shown to best advantage in Figures 1 and 4. This mechanism is disposed for the most part exteriorly of the space between side frame plates 80, 82, being carried by the plate 80.

The mechanism 157 includes a continuously rotating disc 158 secured to the shaft 156 for rotation therewith. A radially extending, slotted connector plate 160 is fixedly secured to disc 158, and has a radial slot 161 receiving a pin 162 on which is freely rotatable a head 164 carried by one end of a connecting rod or pitman 166.

Pin 162 is adjustable longitudinally of slot 161 and is adapted to be secured to plate 160 in selected positions to which it is so adjusted. Any suitable means can be employed in this regard to effect the adjustment and the fixed connection of the pin to the plate in the selected position of adjustment. For example, the pin 162 may have a head bearing against plate 160, with a nut being threaded on the pin and causing the plate to be clamped between the head and nut in selected positions to which the pin is shifted. Outwardly from the nut the pin may have a portion on which the head 164 of rod 166 is continuously rotatable.

The purpose of this arrangement is to vary the length of stroke, that is the length of step-by-step feeding of web W. In this connection, mechanism 157 thus further includes a sleeve 168 through which rod 166 extends, with the rod being secured to the sleeve in selected positions of adjustment axially of the sleeve. Sleeve 168 is pivoted at 170 upon the periphery of a pawl support disc 172 which carries a pawl 174 that is pivoted at 176 upon an ear 177 extending radially from disc 172. Pawl 174 is in ratcheting engagement wtih ratchet wheeel 178, secured to a shaft 179 for rotation therewith. The disc 172, of course, is freely rotatable on shaft 179 rather than rotatable therewith.

Obviously, on continuous rotation of disc 158, the disc 172 will be oscillated about the axis defined by shaft 179, turning on shaft 179 a selected number of degrees determined by the adjustment of pin 162 along slot 161. The length of the stroke of the pawl 174, and hence the extent of the angular distance through which ratchet 178 and shaft 179 are conjointly turned, is thus governed by the user.

Referring to Figures 2 and 4, a gear 180 is secured to shaft 179 for rotation therewith, and meshes with a smaller gear 182 rotatable with feed drum shaft 120. Thus, step-by-step advancing of web W, occurring at uniformly spaced, timed intervals, is obtained, with the web being advanced, on each occasion, to a predetermined, adjusted extent. Obviously, this in turn results in the carbon paper being cut to a selected, correspondingly adjusted length, by reason of the fact that the knife or guillotine means falls at predetermined, timed intervals set to occur at the same intervals as the step-by-step advancement of web W.

Designated generally at 183 is a glue applicator mechanism, shown to best advantage in Figures 2 and 5. Said mechanism is used to apply glue to the web, along a selected edge thereof. Said glue may be applied either to the right hand edge or the left hand edge of the web, viewing the same as in Figure 2 and in the illustrated example, the glue is being applied to the right hand edge. When the carbon paper has been cut, said right hand edge might be the top edge of the carbon paper as it appears when interleaved with other papers to provide a business form. Then again, it could be the bottom edge or even a side edge. In a typical working arrangement, the width of a selected roll R would be equal to the length of the individual sheets of carbon, so that the glue edge would appear as the top or bottom edge, whichever is desired, of the individual sheets. Then, by the variable feed mechanism 157, the individual sheets would be cut to selected widths, responsive to step-by-step advancement of the same a distance equal to the width of the carbon.

The glue applicator mechanism generally designated at 183 includes vertically spaced, horizontally disposed, elongated, upwardly opening pots or trays 184 holding a quantity of liquid glue and extending transversely between the side plates, said trays being supported each upon a pair of rods 190 that are connected between the side plates, with the trays having bearing notches in their end walls receiving a shaft on which is rotatable a glue applicator wheel 186. Clamps 188 are carried by studs 189 that extend downwardly from the bottoms of the trays, so that nuts threaded upon the studs force the clamp plates 188 against the support rods 190, thereby fixedly securing the pots or trays to the rods. The applicator wheels are arranged to rotate within the supply of glue, with the upper portions of the wheels extending into contact with the web W, thereby to continuously coat the edge of the web with glue, said wheels being rotated by the advancing web.

To provide for a positive drive of the glue applicator wheels (see Figure 3) a large sprocket 192 is secured to shaft 120 for rotation therewith. A chain 194 trained about sprocket 192 is trained also about sprockets 196, 198 carried by the glue applicator wheel shafts so that the wheels 186, 186 are rotated in opposite directions, since they are in contact with portions of the web that are traveling in correspondingly opposite directions. One wheel applies the glue to one face of the web and the other supplies the glue to the opposite face of the web, so that the finished sheet of carbon will be capable of being interleaved with and adhered to business forms at both sides of the carbon paper.

Chain 194 is maintained under selected tension by passage about a tension-adjusting idler roller 200.

This completes the construction of the glue applicator mechanism 183, said mechanism comprising the components 184–200 inclusive.

Designated generally at 201 is a fly delivery mechanism. This is shown to best advantage in Figures 6–9 and also in Figure 1. It includes a horizontal, transverse shaft 202 connected between the lower forward portions of the side frame plates 80, 82 and extending through a sleeve-like base block 204 of hollow formation (Figures 7 and 8). Fixedly engaged at their bases in uniformly spaced sockets 205 spaced apart longitudinally of block 104 are elongated, straight fingers 206 of hollow formation from end to end thereof, communicating at their inner ends with the interior of the base block or manifold 204, and having uniformly spaced openings 208 in their front surfaces.

The fly delivery mechanism includes additional components, which will be described hereinafter. For the moment, however, it is appropriate at this time to describe a receiving table assembly generally designated 209, on which cut sheets S are stacked, following cutting of the web upon the fly delivery mechanism 201 (see Figure 1) and swinging of the finger assembly forwardly from its normally retracted, Figure 1 position (shown also in Figure 7) to its discharge position shown in chain-dotted lines in Figure 3 and shown also in Figure 8. In actuality, in Figure 3, the fingers 206 are not in their full delivery position, which position is one in which the fingers are in direct, face-to-face contact with the receiving table assembly 209.

The receiving table assembly 209 includes a flat table member 210, inclined slightly from the horizontal. Table member 210 has corner openings, receiving magnetic guides 212, held by a flat plate 214 faced downwardly from and lying in a plane parallel to the plane of table member 210, so that the printed sheets may be fed accurately to the table following completion of the carbon gluing and cutting operations. It will be understood that the sheets S of the cut carbon can be fed to the table in alternating relation to the sheets with which they are to be interleaved, said last named sheets being dropped to the table by other apparatus having no relation to the present invention.

Adjustment of the table 210, upwardly or downwardly, is provided by threaded support shanks 216 swiveled in the opposite side portions of the table member, said shanks 216 being threadedly engaged in internally threaded sleeves 218 that constitute the hubs of handles 220 that bear against the bight portions of U-shaped hangers 222 fixedly secured to and extending outwardly from bars 66, 68 respectively.

Thus, by rotation of the hand wheels, the table member 210 is adjusted upwardly or downwardly, it being understood that as the stack of sheets S mounts thereon, the table member will be, from time to time, lowered so as to provide a receiving pile table to which the sheets are delivered by the fly delivery mechanism 201.

Reverting now to the fly delivery mechanism 201, and referring in particular to Figures 3 and 6, secured fixedly to shaft 202 is a short crank arm 224 to the outer end of which is pivotally connected an elongated, straight, approximately horizontal link 226, pivotally connected to an obtusely angular arm 228, at one end of said arm 228, by means of a pin 230.

Arm 228 swings in a vertical plane about an unchanging axis defined by a laterally, outwardly projecting pin 232, which is fixedly secured to side plate 82. At the juncture of its angularly related legs, arm 228 has a roller 234 in contact with the periphery of a cam 236, which cam has the form of a segment of a circle with an arcuate cam edge extending through slightly more than 180° and merging into a cam recess 237. A contractile spring 238 is connected at one end to arm 228 adjacent the pivotal connection 230, and at its other end is connected to side plate 82, to continuously urge arm 228 against the cam 236.

It will be apparent that as the cam rotates, said cam being secured to shaft 156 for rotation therewith, roller 234 at predetermined, timed intervals will move off the arcuate high side of the cam into the recess 237, causing arm 224 to swing in a counterclockwise direction from its Figure 3 position, to its dotted line position in the same figure of the drawing, thereby biasing the several fingers 206 forwardly to the table member 210. In this connection, the fingers travel about their axis through 110°, in a preferred embodiment.

The fly delivery mechanism 201 further includes a valve assembly generally designated 239. Said assembly is intended, in time relationship to the swinging of the fingers between their retracted and delivery positions, to create pressure and vacuum conditions, respectively, in the several fingers. Referring to Figure 7, a vacuum condition is created in each finger 206 when the finger is in its retracted position shown in Figures 1 and 7. However, when the finger reaches its forward, delivery position shown in Figure 8, the vacuum condition is suddenly changed to a pressure condition, for the purpose of releasing the sheet S.

Considering the vacuum and pressure creating means in greater detail, and referring to Figure 3, a valve control cam 240 is secured to shaft 156 for rotation therewith, and as shown in Figure 6 has a stepped cam projection including an outer cam step 242 and an inner step 244 leading in the sense of direction of rotation of the cam, which is counterclockwise in Figures 3 and 6.

A valve operating arm 246 overlies cam 240 in the plane of rotation of the cam, and is pivotally connected at one end to a pin 248 projecting laterally outwardly from side plate 82. The cam 240 is in contact with the underside of the arm, and thus it will be seen that during the greatest part of the rotational movement of cam 240, arm 246 will be the lower position. Then, the arm will ride up on cam step 242, moving to its uppermost position. Then, the arm will drop almost immediately to its lowermost position. Arm 246 has a roller 250 constituting the portion of the arm that is in engagement with the cam 240.

At its forward end, arm 246 is pivotally connected to a pin 252 projecting laterally outwardly from the lower end of a vertically extending plunger or valve stem 254 that is vertically slidable in a rectangular valve block or casing 256, said block 256 having fittings connected to pressure and vacuum lines 258, 260 respectively. Connected to the opposite side of the housing 256 is a line 262 extending into communication with the manifold 204. Also connected to said opposite side of housing 256 is a line 263 which is in communication with atmosphere.

A vertical bore 264 of housing 256 extends fully from the upper to the lower extremities thereof, and axially reciprocable in said bore are spaced plugs 266, 268 connected by a neck 269 slightly smaller in diameter than the bore. Stem 254 is secured to the lower plug 268.

Four lateral or transverse bores are formed in the housing, all but one being Y-shaped, two of said transverse bores or passages being at one side of the bore 264 and the others being at the opposite side of said bore. Thus, there is a transverse bore 270, connected at its outer end in communication with pressure line 258, and formed at its inner end with branch bores 272, 274 opening upon bore 264 at locations spaced longitudinally of bore 264. Below bore 270 there is a bore 276, having branch bores 278, 280 also communicating with bore 264.

A bore 282 is connected between bore 264 and the line 263, that communicates with atmosphere. Bore 282 is diametrically opposite the lower branch 280 of bore 276.

Also diametrically opposite the bores 270, 276 is a Y-shaped bore 284, having at its inner end branch bores 286, 288 communicating with bore 264 at locations diametrically opposite branches 274, 278 respectively. Bore 284 is connected in communication with line 262.

A three-way valve is thus provided, and in one condition of the valve, shown in Figure 7, air under pressure will flow through line 258, branch 272, and out the upper end of bore 264 to atmosphere, branch 274 being blocked by plug 266. In line 260 a vacuum condition is created, and plug 268 prevents communication between bores 282, 280, while branches 278, 288 are in communication through the provision of the reduced neck portion 269, which is abreast of these branches. Therefore, a vacuum condition is created in line 262 and hence in the fingers 206, causing air to be sucked in through perforations 208, thereby causing the web W to adhere to the front surfaces of the retracted fingers as shown in Figure 1 and in Figure 7.

In a second position of the valve, shown in Figure 8, this being the position when the fingers 206 are at their delivery positions shown in the same figure of the drawing, plug 266 is elevated, so that now, air under pressure is forced through line 258 and branch 274, past the reduced neck portion 269 into branch 286, and through line 262 and out of perforations 208 of fingers 206, to eject the sheet S onto the table. The vacuum line is connected with atmosphere through branch 280 and bore 282.

In actuality the purpose of the steps 244, 242 is to elevate the arm 246 progressively to its uppermost position, in which the arm shifts stem 254 to its Figure 8 position. Then, the arm drops down almost immediately to its lower position in which the stem 254 is as shown in Figure 7.

Therefore, with lines 258, 260 connected to a conventional vacuum pump, not shown, it will be apparent that a vacuum condition persists in the fingers 206 for the greatest part of the cycle of the operation. In other words as long as the fingers are retracted, there is a vacuum condition therein. Then, when the fingers swing forwardly due to engagement of arm 228 with the low side of cam 236, there will be a movement of the valve plunger to its Figure 8 position, resulting from movement of the arm 246 onto the cam projection or step 242. There is a light blast of air of short duration at this point as shown in Figure 8, causing sheet S to be released. Thereafter, almost immediately a vacuum condition is created once again, so that the next sheet to be delivered will adhere to the retracted fingers.

It is appropriate now to consider the knife or guillotine assembly, which has been generally designated 289. This is shown to best advantage in Figures 1, 3, and 5. Secured to the shaft 156 is a cam 290 which is of circular formation, having a depression or low side 291 (Figure 5). In engagement with the periphery of the cam is a roller 292 on the free end of a short crank arm 294 secured to a shaft 295 for rotation therewith, said shaft extending transversely between and being engaged at its ends in the respective side frame plates. Also secured to shaft 295 for rotation therewith is a longer crank arm 296 angularly related to crank arm 294 and inclined in a direction rearwardly upwardly from the shaft 295, as best shown in Figure 5. Arm 296 at its outer end is pivotally connected to a curved member 298, curving through substantially 90°, this being connected to the lower end of an elongated connecting rod 300. A pullback spring 302 is connected between cross bar 70 or some other fixed portion of the structure and the free end portion of arm 296 as best shown in Figure 5, said spring tending to pull arm 296 downwardly and being free to do so whenever roller 292 rides onto the cam depression 291 as shown, for example, in dotted lines in Figure 5.

Rod 300, at its upper end, is connected to a block 304 which is bifurcated to receive an ear projecting forwardly from a movable knife blade 305. Blade 305, as shown in Figure 1, extends transversely of the apparatus, at the upper ends of the retracted fingers, being disposed in front of and in shearing relation to a stationary bed knife 306 fixedly mounted in position extending transversely between the side frame plates.

Projecting rearwardly from opposite ends of the movable blade 305 are pins 308 (Figure 5) having heads at their rear ends. Compression, coil springs 310 are circumposed about the pins, being held under compression between the stationary bed knife 306 and the heads of the pins 308. Thus, the movable knife 305 is continuously forced in a direction transversely thereof, into intermittent, face-to-face contact with the bed knife, thereby to insure a true shearing action at all times.

One of the pins is engaged in a guide slot provided upon the left hand end of the bed knife, viewing the same as in Figure 1. The other pin is extended through an opening of the bed knife, which opening is not of slot-like form so that movable knife 305 pivots upon the pin 308 shown at the right in Figure 1. The pin 308 at the left in Figure 1 does not appear, but is connected directly to an enlarged portion 312 of the movable blade, said pin at the left extending through slots 314 formed in the bed knife, the slots 314 being curved about the axis of the right hand pin 308, viewing the same as in Figure 1.

When knife 305 is raised, there is created a narrow space through which the web W is led, and when the web has been fed through said space to the desired extent, resulting from the predetermined adjustments of the variable feed mechanism 147, the web can be cut to the length of the desired sheet S. The guillotine drops only while there is a vacuum condition within the fingers, so that when the sheet is cut while the fingers are still retracted, said sheet will adhere to the fingers and will remain in adherence until the fingers have been swung forwardly and are ready to deliver the sheet to the table member 210.

All this, of course, is in a predetermined, timed relation and has been found to produce completely satisfactory results, in a full sized, working embodiment of the invention. In use, it will be understood that the web W will be fed about the several idler rollers 90—100, and will have glue applied to the opposite faces thereof or, if desired, to only one face of the web. In any event, the advancement of the web is in a step-by-step action, at timed intervals, with the web being advanced a selected distance all as previously described herein. In timed relation to the advancement of the web, there is the dropping of the knife, with each advancement of the web being followed by a cutting thereof. Also in timed relation to said advancement and cutting is the creation of the vacuum and pressure conditions, in alternating sequence, in the fingers. Still further, the fingers are swung from their retracted to their extended positions, following each cutting of a sheet. When the fingers return to retracted positions, there is a further advancement of the web, to locate a new portion thereof in overlying relation to the fingers.

It has been found that by this comparatively simple mechanism, carbon of different widths and lengths can be edge-glued along any selected edge thereof, and will be automatically cut to size, and delivered for stacking on a table, to be interleaved with other sheets of a business form.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. Apparatus for applying adhesive to, cutting into sheet form, and stacking roll stock, comprising: a support structure; a roll support assembly thereon adapted for rotatably supporting a roll from which a web is to extend; a web-advancing assembly on said support structure for advancing the web, including a series of guide rollers about which the web is trained to advance the same from the roll support assembly; a feed mechanism acting on said web to effect step-by-step advancement thereof at predetermined, timed intervals; mechanism on the support structure for applying adhesive to the web during said advancement thereof; a fly delivery mechanism to which the web is advanced, pivoted on said structure to swing between a normally retracted, upwardly extending position in which the web is in overlying relation thereto and a forwardly projecting, delivery position to deliver a sheet cut from the web; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, including driving linkages extending to each of said assemblies and said mechanisms, said linkages being interconnected for synchronous operation effective to produce in sequences, in a single cycle of operation, a single advancement of the web, a single cutting stroke by the knife assembly, and a single movement of the fly delivery mechanism to its delivery position, said fly delivery mechanism including a series of fingers spaced transversely of the support structure with their lengths extending normally to the length of said blade, the fingers being hollow and having perforations spaced apart longitudinally of the fingers over the full length thereof, said fly delivery mechanism including means tending to create a vacuum condition in the fingers for causing the web to adhere to the fingers, said fingers having distal ends terminating in close proximity to the blade in said retracted position of the fly delivery mechanism.

2. Apparatus for edge-gluing, cutting into sheet form, and stacking roll carbon stock, comprising: a support structure; a roll carbon support assembly thereon adapted for rotatably supporting a roll from which a web is to extend; a web-advancing assembly on said support structure for advancing the web, including a feed drum; a feed mechanism for step-by-step advancement of the web, including a disc, a ratchet wheel rotatable with the drum, a pitman connected to the disc for reciprocation responsive to rotation of the disc, an oscillating member connected to the pitman for oscillation responsive to reciprocation of the pitman, and a pawl carried by the oscillating member in engagement with the ratchet wheel, the feed mechanism acting on said web to effect said step-by-step advancement of the same at predetermined, timed intervals; mechanism on the support structure for applying adhesive to the web during said advancement thereof; a fly delivery mechanism to which the web is advanced, pivoted on said structure to swing between a normally retracted, upwardly extending position in which the web is in overlying relation thereto and a forwardly projecting, delivery position to deliver a sheet cut from the web; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, including driving linkages extending to each of said assemblies and said mechanisms, said linkages being inter-connected for synchronous operation effective to produce in sequence, in a single cycle of operation, a single advancement of the web, a single cutting stroke by the knife assembly, and a single movement of the fly delivery mechanism to its delivery position, said fly delivery mechanism including a series of fingers spaced transversely of the support structure with their lengths extending normally to the length of said blade, the fingers being hollow and having perforations spaced apart longitudinally of the fingers over the full length thereof, said fly delivery mechanism including means tending to create a vacuum condition in the fingers for causing the web to adhere to the fingers, said fingers having distal ends terminating in close proximity to the blade in said retracted position of the fly delivery mechanism.

3. Apparatus for edge-gluing, cutting into sheet form, and stacking roll carbon stock, comprising: a support structure; a roll carbon support assembly thereon adapted for rotatably supporting a roll from which a web is to extend; a web-advancing assembly on said support structure for advancing the web, including a feed drum; a feed mechanism including a disc, a ratchet wheel rotatable with the drum, a pitman connected to the disc for reciprocation responsive to rotation of the disc, the connection of the pitman to the disc being adjustable in a direction radially of the disc so as to provide for selected variation of the length of the stroke of the pitman, an oscillating member connected to the pitman for oscillation responsive to reciprocation of the pitman and oscillating through a selected angular distance responsive to corresponding, selected adjustment of the length of the stroke of the pitman, and a pawl carried by the oscillating member in engagement with the ratchet wheel for rotating the ratchet wheel an angular distance corresponding to that through which the oscillating member is turned; mechanism on the support structure for applying adhesive to the web during said advancement thereof; a fly delivery mechanism to which the web is advanced, pivoted on said structure to swing between a normally retracted, upwardly extending position in which the web is in overlying relation thereto and a forwardly projecting, delivery position to deliver a sheet cut from the web; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, including driving linkages extending to each of said assemblies and said mechanisms, said linkages being inter-connected for synchronous operation effective to produce in sequence, in a single cycle of operation, a single advancement of the web, a single cutting stroke by the knife assembly, and a single movement of the fly delivery mechanism to its delivery position, said fly delivery mechanism including a series of fingers spaced transversely of the support structure with their lengths extending normally to the length of said blade, the fingers being hollow and having perforations spaced apart longitudinally of the fingers over the full length thereof, said fly delivery mechanism including means tending to create a vacuum condition in the fingers for causing the web to adhere to the fingers, said fingers having distal ends terminating in close proximity to the blade in said retracted position of the fly delivery mechanism.

4. Apparatus for edge-gluing, cutting into sheet form, and stacking rolled carbon stock, comprising: a support structure; a roll carbon support assembly thereon adapted for rotatably supporting a roll from which a web is to extend; a web-advancing assembly on said support structure for advancing the web, including a series of idler rollers about which the web is trained and a feed drum to which the web is led after passing about the idler rollers; a feed mechanism operatively connected to the feed drum and rotating the same intermittently at predetermined, timed intervals, to effect a step-by-step advancement of the web at said intervals; mechanism on the support structure for applying glue to a selected edge portion of the web during said advancement thereof; a fly delivery mechanism to which said web is advanced, pivoted on said structure to swing between a normally retracted, upwardly extending position in which the web is in overlying relation thereto and a forwardly projecting, delivery position to deliver a sheet cut from the web; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, including driving linkages extending to each of said assemblies and said mechanisms, said linkages being inter-connected for synchronous operation effective to produce in sequence, in a single cycle of operation, a single advancement of the web, a single cutting stroke by the knife assembly, and a single movement of the fly delivery mechanism to its delivery position, said fly delivery mechanism including a series of fingers spaced transversely of the support structure with their lengths extending normally to the length of said blade, the fingers being hollow and having perforations spaced apart longitudinally of the fingers over the full length thereof, said fly delivery mechanism including means tending to create a vacuum condition in the fingers for causing the web to adhere to the fingers, said fingers having distal ends terminating in close proximity to the blade in said retracted position of the fly delivery mechanism.

5. Apparatus for edge-gluing, cutting into sheet form, and stacking rolled carbon stock, comprising: a support structure; a roll carbon support assembly thereon adapted for rotatably supporting a roll from which a web is to extend; a web-advancing assembly on said support structure for advancing the web, including a series of idler rollers about which the web is trained and a feed drum to which the web is led after passing about the idler rollers; a feed mechanism operatively connected to the feed drum and rotating the same intermittently at predetermined, timed intervals, to effect a step-by-step advancement of the web at said intervals; mechanism on the support structure for applying glue to a selected edge portion of the web during said advancement thereof; a fly delivery mechanism to which said web is advanced, pivoted on said structure to swing between a normally retracted, upwardly extending position in which the web is in overlying relation thereto and a forwardly projecting, delivery position to deliver a sheet cut from the web; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, said web-advancing assembly, the feed mechanism, the fly delivery mechanism, and the knife assembly being operatively, drivingly interrelated in a manner effective to produce a single advancement of the web, a single cutting of the same, and a single movement of the fly delivery mechanism to its delivery position, in each cycle of operation of the apparatus, said fly delivery mechanism including a series of fingers spaced transversely of the support structure with their lengths extending normally to the length of said blade, the fingers being hollow and having perforations spaced apart longitudinally of the fingers over the full length thereof, said fly delivery mechanism including means tending to create a vacuum condition in the fingers for causing the web to adhere to the fingers, said fingers having distal ends terminating in close proximity to the blade in said retracted position of the fly delivery mechanism.

6. Apparatus for edge-gluing, cutting into sheet form, and stacking rolled carbon stock, comprising: a support structure; a roll carbon support assembly thereon adapted for rotatably supporting a roll from which a web is to extend; a web-advancing assembly on said support structure for advancing the web, including a series of idler rollers about which the web is trained and a feed drum to which the web is led after passing about the idler rollers; a feed mechanism operatively connected to the feed drum and rotating the same intermittently at predetermined, timed intervals, to effect a step-by-step advancement of the web at said intervals; mechanism on the support structure for applying glue to a selected edge portion of the web during said advancement thereof; a fly delivery mechanism to which said web is advanced, pivoted on said structure to swing between a normally retracted, upwardly extending position in which the web is in overlying relation thereto and a forwardly projecting, delivery position to deliver a sheet cut from the web; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, said web-advancing assembly, the feed mechanism, the fly delivery mechanism, and the knife assembly being operatively, drivingly interrelated in a manner effective to produce a single advancement of the web, a single cutting of the same, and a single movement of the fly delivery mechanism to its delivery position, in each cycle of operation of the apparatus, the single-step web advancement occurring with the fly delivery mechanism in retracted position, said cutting of the web occurring following said single-step advancement, said fly delivery mechanism including a series of fingers spaced transversely of the support structure with their lengths extending normally to the length of said blade, the fingers being hollow and having perforations spaced apart longitudinally of the fingers over the full length thereof, said fly delivery mechanism including means tending to create a vacuum condition in the fingers for causing the web to adhere to the fingers, said fingers having distal ends terminating in close proximity to the blade in said retracted position of the fly delivery mechanism.

7. Apparatus for edge-gluing, cutting into sheet form, and stacking rolled carbon stock, comprising: a support structure; a roll carbon support assembly thereon adapted for rotatably supporting a roll from which a web is to extend; a web-advancing assembly on said support structure for advancing the web, including a series of idler rollers about which the web is trained and a feed drum to which the web is led after passing about the idler rollers; a feed mechanism operatively connected to the feed drum and rotating the same intermittently at predetermined, timed intervals, to effect a step-by-step advancement of the web at said intervals; mechanism on the support structure for applying glue to a selected edge portion of the web during said advancement thereof; a fly delivery mechanism to which said web is advanced, pivoted on said structure to swing between a normally retracted, upwardly extending position in which the web is in overlying relation thereto and a forwardly projecting, delivery position to deliver a sheet cut from the web; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, said web-advancing assembly, the feed mechanism, the fly delivery mechanism, and the knife assembly being operatively, drivingly interrelated in a manner effective to produce a single advancement of the web, a single cutting of the same, and a single movement of the fly delivery mechanism to its delivery position, in each cycle of operation of the apparatus, the single-step web advancement occurring with the fly delivery mechanism in retracted position, said cutting of the web occurring following said single-step advancement, said fly delivery mechanism including a series of fingers spaced transversely of the support structure with their lengths extending normally to the length of said blade, the fingers being hollow and having perforations spaced apart longitudinally of the fingers over the full length thereof, said fly delivery mechanism including means tending to create a vacuum condition in the fingers for causing the web to adhere to the fingers, said fingers having distal ends terminating in close proximity to the blade in said retracted position of the fly delivery mechanism.

8. Apparatus for edge-gluing, cutting into sheet form, and stacking rolled carbon stock, comprising: a support structure; a roll carbon support assembly thereon adapted for rotatably supporting a roll from which a web is to extend; a web-advancing assembly on said support structure for advancing the web, including a series of idler rollers about which the web is trained and a feed drum to which the web is led after passing about the idler rollers; a feed mechanism operatively connected to the feed drum and rotating the same intermittently at predetermined, timed intervals, to effect a step-by-step advancement of the web at said intervals; mechanism on the support structure for applying glue to a selected edge portion of the web during said advancement thereof; a fly delivery mechanism to which said web is advanced, pivoted on said structure to swing between a normally retracted, upwardly extending position in which the web is in overlying relation thereto and a forwardly projecting, delivery position to deliver a sheet cut from the web; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, said web-advancing assembly, the feed mechanism, the fly delivery mechanism, and the knife assembly being operatively, drivingly interrelated in a manner effective to produce a single advancement of the web, a single cutting of the same, and a single movement of the fly delivery mechanism to its delivery position, in each cycle of operation of the apparatus, the single-step web advancement occurring with the fly delivery mechanism in retracted position, said cutting of the web occurring following said single-step advancement, the fly delivery mechanism including a plurality of fingers with which said web is in contact, said fingers having a series of perforations spaced longitudinally thereof, the fly delivery mechanism including means to create a vacuum condition at the location of said perforations, for the major part of each cycle of operation of the apparatus, to cause said web and sheet to adhere to said fly delivery mechanism.

9. Apparatus for edge-gluing, cutting into sheet form, and stacking rolled carbon stock, comprising: a support structure; a roll carbon support assembly thereon adapted for rotatably supporting a roll from which a web is to extend; a web-advancing assembly on said support structure for advancing the web, including a series of idler rollers about which the web is trained and a feed drum to which the web is led after passing about the idler rollers; a feed mechanism operatively connected to the feed drum and rotating the same intermittently at predetermined, timed intervals, to effect a step-by-step advancement of the web at said intervals; mechanism on the support structure for applying glue to a selected edge portion of the web during said advancement thereof; a fly delivery mechanism to which said web is advanced, pivoted on said structure to swing between a normally retracted, upwardly extending position in which the web is in overlying relation thereto and a forwardly projecting, delivery position to deliver a sheet cut from the web; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, said web-advancing assembly, the feed mechanism, the fly delivery mechanism, and the knife assembly being operatively, drivingly interrelated in a manner effective to produce a single advancement of the web, a single cutting of the same, and a single movement of the fly delivery mechanism to its delivery position, in each cycle of operation of the apparatus, the single-step web advancement occurring with the fly delivery mechanism in retracted position, said cutting of the web occurring following said single-step advancement, the fly delivery mechanism including a plurality of fingers with which said web is in contact, said fingers having a series of perforations spaced longitudinally thereof, the fly delivery mechanism including means to create a vacuum condition at the location of said perforations, for the major part of each cycle of operation of the apparatus, to cause said web and sheet to adhere to said fly delivery mechanism, said last named means being adapted for temporarily breaking said vacuum following movement of the fingers to the delivery position of the fly delivery mechanism, whereby to release the cut sheet for dropping to said table assembly.

10. Apparatus for edge-gluing, cutting into sheet form, and stacking roll carbon stock, comprising: a support structure; a roll carbon support assembly thereon adapted for rotatably supporting a roll from which a web is to extend; a web-advancing assembly on said support structure for advancing the web including a series of idler rollers about which the web is trained and a feed drum about which the web is led after passing about the idler rollers; a feed mechanism operatively connected to the feed drum and adapted to rotate the same intermittently at predetermined, timed intervals to effect a step-by-step advancement of the web at said intervals; mechanism on the support structure for supplying glue to a selected edge portion of the web during said advancement thereof, comprising a plurality of glue pots mounted on said support structure and applicator rolls rotatably mounted in said pots in position to peripherally contact the web; a fly delivery mechanism to which said web is advanced, pivoted on said structure to swing between a normally retracted, upwardly extending position in which the web is in overlying relation thereto and a forwardly projecting, delivery position to deliver a sheet cut from the web; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, said web-advancing assembly, the feed mechanism, the fly delivery mechanism, and the knife assembly being operatively, drivingly interrelated in a manner effective to produce a single advancement of the web, a single cutting of the same, and a single movement of the fly delivery mechanism to its delivery position, in each cycle of operation of the apparatus, the single-step web advancement occurring with the fly delivery mechanism in retracted position, said cutting of the web occurring following said single-step advancement, the fly delivery mechanism including a plurality of fingers with which said web is in contact, said fingers having a series of perforations spaced longitudinally thereof, the fly delivery mechanism including means to create a vacuum condition at the location of said perforations, for the major part of each cycle of operation of the apparatus, to cause said web and sheet to adhere to said fly delivery mechanism, said last named means being adapted for temporarily breaking said vacuum following movement of the fingers to the delivery position of the fly delivery mechanism, whereby to release the cut sheet for dropping to said table assembly.

11. Apparatus for edge-gluing, cutting into sheet form, and stacking roll carbon stock, comprising: a support structure; a roll carbon support assembly thereon adapted for rotatably supporting a roll from which a web is to extend; a web-advancing assembly on said support structure for advancing the web including a series of idler rollers about which the web is trained and a feed drum about which the web is led after passing about the idler rollers; a feed mechanism operatively connected to the feed drum and adapted to rotate the same intermittently at predetermined, timed intervals to effect a step-by-step advancement of the web at said intervals; mechanism on the support structure for supplying glue to a selected edge portion of the web during said advancement thereof, comprising a plurality of glue pots mounted on said support structure and applicator rolls rotatably mounted in said pots in position to peripherally contact the web; a fly delivery mechanism to which said web is advanced, pivoted on said structure to swing between a normally retracted, upwardly extending position in which the web is in overlying relation thereto and a forwardly projecting, delivery position to deliver a sheet cut from the web; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, said web-advancing assembly, the feed mechanism, the fly delivery mechanism, and the knife assembly being operatively, drivingly interreleated in a manner effective to produce a single advancement of the web, a single cutting of the same, and a single movement of the fly delivery mechanism to its delivery position, in each cycle of operation of the apparatus, the single-step web advancement occurring with the fly delivery mechanism in retracted position, said cutting of the web occurring following said single-step advancement, the fly delivery mechanism including a plurality of fingers with which said web is in contact, said fingers having a series of perforations spaced longitudinally thereof, the fly delivery mechanism including means to create vacuum condition at the location of said perforations, for the major part of each cycle of operation of the apparatus, to cause said web and sheet to adhere to said fly delivery mechanism, said last named means being adapted for temporarily breaking said vacuum following movement of the fingers to the delivery position of the fly delivery mechanism, whereby to release the cut sheet for dropping to said table assembly, said applicator wheels being mounted upon the glue pots for adjustment in a direction transversely of the web for engaging the web at selected locations between the opposite side edges of the web.

12. Apparatus for edge-gluing, cutting into sheet form, and stacking roll carbon stock, comprising: a support structure; a roll carbon support assembly thereon adapted for rotatably supporting a roll from which a web is to extend; a web-advancing assembly on said support structure for advancing the web including a series of idler rollers about which the web is trained and a feed drum about which the web is led after passing about the idler rollers; a feed mechanism operatively connected to the feed drum and adapted to rotate the same intermittently at predetermined, timed intervals to effect a step-by-step advancement of the web at said intervals; mechanism on the support structure for supplying glue to a selected edge portion of the web during said advancement thereof, comprising a plurality of glue pots mounted on said support structure and applicator rolls rotatably mounted in said pots in position to peripherally contact the web; a fly delivery mechanism to which said web is advanced, pivoted on said structure to swing between a normally retracted, upwardly extending position in which the web is in overlying relation thereto and a forwardly projecting, delivery position to deliver a sheet cut from the web; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, said web-advancing assembly, the feed mechanism, the fly delivery mechanism, and the knife assembly being operatively, drivingly interrelated in a manner effective to produce a single advancement of the web, a single cutting of the same, and a single movement of the fly delivery mechanism to its delivery position, in each cycle of operation of the apparatus, the single-step web advancement occurring with the fly delivery mechanism in retracted position, said cutting of the web occurring following said single-step advancement, the fly delivery mechanism including a plurality of fingers with which said web is in contact, said fingers having a series of perforations spaced longitudinally thereof, the fly delivery mechanism including means to create a vacuum condition at the location of said perforations, for the major part of each cycle of operation of the apparatus, to cause said web and sheet to adhere to said fly delivery mechanism, said last named means being adapted for temporarily breaking said vacuum following movement of the fingers to the delivery position of the fly delivery mechanism, whereby to release the cut sheet for dropping to said table assembly, said drive means including a connection extending from the feed drum to the respective applicator wheels, for intermittent rotation of the applicator wheels conjointly with the feed drum.

13. Apparatus for applying adhesive to, cutting into sheet form, and stacking roll stock, comprising: a support structure; a roll support assembly thereon adapted for rotatably supporting a roll from which a web is to extend; a web-advancing assembly on said support structure for advancing the web, including a series of guide rollers about which the web is trained to advance the same from the roll support assembly; a feed mechanism acting on said web to effect step-by-step advancement thereof at predetermined, timed intervals; mechanism on the support structure for applying adhesive to the web during said advancement thereof; a fly delivery mechanism to which the web is advanced, pivoted on said structure to swing between a normally retracted, upwardly extending position in which the web is in overlying relation thereto and a forwardly projecting, delivery position to deliver a sheet cut from the web, said mechanism including a manifold, a series of hollow fingers in communication with the manifold, each finger having a longitudinal series of perforations, means for creating a vacuum in said manifold and fingers to cause the sheet to adhere to the fingers, and means for temporarily breaking the vacuum when the fingers are in delivery position; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly.

14. Apparatus for applying adhesive to, cutting into sheet form, and stacking roll stock, comprising: a support structure; a roll support assembly thereon adapted for rotatably supporting a roll from which a web is to extend; a web-advancing assembly on said support structure for advancing the web, including a series of guide rollers about which the web is trained to advance the same from the roll support assembly; a feed mechanism acting on said web to effect step-by-step advancement thereof at predetermined, timed intervals; mechanism on the support structure for applying adhesive to the web during said advancement thereof; a fly delivery mechanism to which the web is advanced, pivoted on said structure to swing between a normally retracted, upwardly extending position in which the web is in overlying relation thereto and a forwardly projecting, delivery position to deliver a sheet cut from the web, said mechanism including a manifold, a series of hollow fingers in communication with the manifold, each finger having a longitudinal series of perforations, means for creating a vacuum in said manifold and fingers to cause the sheet to adhere to the fingers, and means for temporarily breaking the vacuum when the fingers are in delivery position, said means for creating the vacuum including a valve assembly in communication with the manifold and adapted to control the exhaustion of air from the manifold, said valve assembly being adapted for connection to a vacuum pump; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly.

15. Apparatus for applying adhesive to, cutting into sheet form, and stacking roll stock, comprising: a support structure; a roll support assembly thereon adapted for rotatably supporting a roll from which a web is to extend; a web-advancing assembly on said support structure for advancing the web, including a series of guide rollers about which the web is trained to advance the same from the roll support assembly; a feed mechanism acting on said web to effect step-by-step advancement thereof at predetermined, timed intervals; mechanism on the support structure for applying adhesive to the web during said advancement thereof; a fly delivery mechanism to which the web is advanced, pivoted on said structure to swing between a normally retracted, upwardly extending position in which the web is in overlying relation thereto and a forwardly projecting, delivery position to deliver a sheet cut from the web, said mechanism including a manifold, a series of hollow fingers in communication with the manifold, each finger having a longitudinal series of perforations, means for creating a vacuum in said manifold and fingers to cause the sheet to adhere to the fingers, and means for temporarily breaking the vacuum when the fingers are in delivery position, said means for creating the vacuum including a valve assembly in communication with the manifold and adapted to control the exhaustion of air from the manifold, said valve assembly being adapted for connection to a vacuum pump, said means for temporarily breaking the vacuum comprising a cam mounted for continuous rotation upon the support structure, an arm engaging the cam and pivoted on the support structure so as to be swung at predetermined intervals during rotation of the cam, and a valve plunger connected to said arm and extending into the valve assembly, for operating the valve assembly between opposite extreme positions responsive to rising and falling, respectively, of the arm; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly.

16. Apparatus for applying adhesive to, cutting into sheet form, and stacking roll stock, comprising: a support structure; a roll support assembly thereon adapted for rotatably supporting a roll from which a web is to extend; a web-advancing assembly on said support structure for advancing the web, including a series of guide rollers about which the web is trained to advance the same from the roll support assembly; a feed mechanism acting on said web to effect step-by-step advancement thereof at predetermined, timed intervals; mechanism on the support structure for applying adhesive to the web during said advancement thereof; a fly delivery mechanism to which the web is advanced, pivoted on said structure to swing between a normally retracted, upwardly extending position in which the web is in overlying relation thereto and a forwardly projecting, delivery position to deliver a sheet cut from the web, said mechanism including a manifold, a series of hollow fingers in communication with the manifold, each finger having a longitudinal series of perforations, means for creating a vacuum in said manifold and fingers to cause the sheet to adhere to the fingers, and means for temporarily breaking the vacuum when the fingers are in delivery position, said means for creating the vacuum including a valve assembly in communication with the manifold and adapted to control the exhaustion of air from the manifold, said valve assembly being adapted for connection to a vacuum pump, said means for temporarily breaking the vacuum comprising a cam mounted for continuous rotation upon the support structure, an arm engaging the cam and pivoted on the support structure so as to be swung at predetermined intervals during rotation of the cam, and a valve plunger connected to said arm and extending into the valve assembly, for operating the valve assembly between opposite extreme positions responsive to rising and falling, respectively, of the arm; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, said means for driving the fly delivery mechanism including a driving connection with the cam adapted for effecting said continuous rotation of the cam.

17. Apparatus for applying adhesive to, cutting into sheet form, and stacking roll stock, comprising: a support structure; a roll support assembly thereon adapted for rotatably supporting a roll from which a web is to extend; a web-advancing assembly on said support structure for advancing the web, including a series of guide rollers about which the web is trained to advance the same from the roll support assembly; a feed mechanism acting on said web to effect step-by-step advancement thereof at predetermined, timed intervals; mechanism on the support structure for applying adhesive to the web during said advancement thereof; a fly delivery mechanism to which the web is advanced, pivoted on said structure to swing between a normally retracted, upwardly extending position in which the web is in overlying relation thereto and a forwardly projecting, delivery position to deliver a sheet cut from the web, said mechanism including a manifold, a series of hollow fingers in communication with the manifold, each finger having a longitudinal series of perforations, means for creating a vacuum in said manifold and fingers to cause the sheet to adhere to the fingers, and means for temporarily breaking the vacuum when the fingers are in delivery position, said means for creating the vacuum including a valve assembly in communication with the manifold and adapted to control the exhaustion of air from the manifold, said valve assembly being adapted for connection to a vacuum pump, said means for temporarily breaking the vacuum comprising a cam mounted for continuous rotation upon the support structure, an arm engaging the cam and pivoted on the support structure so as to be swung at predetermined intervals during rotation of the cam, and a valve plunger connected to said arm and extending into the valve assembly, for operating the valve assembly between opposite extreme positions responsive to rising and falling, respectively, of the arm; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, said means for driving the fly delivery mechanism including a driving connection with the cam adapted for effecting said continuous rotation of the cam, and further including a connection to said manifold adapted for oscillating the manifold at predetermined, timed intervals, said fingers radiating from the manifold so as to be swung in an oscillating movement between their retracted and delivery positions respectively.

18. Apparatus for applying adhesive to, cutting into sheet form, and stacking roll stock, comprising: a support structure; a roll support assembly thereon adapted for rotatably supporting a roll from which a web is to extend; a web-advancing assembly on said support structure for advancing the web, including a series of guide rollers about which the web is trained to advance the same from the roll support assembly; a feed mechanism acting on said web to effect step-by-step advancement thereof at predetermined, timed intervals; mechanism on the support structure for applying adhesive to the web during said advancement thereof; a fly delivery mechanism to which the web is advanced, pivoted on said structure to swing between a normally retracted, upwardly extending position in which the web is in overlying relation thereto and a forwardly projecting, delivery position to deliver a sheet cut from the web, said mechanism including a manifold, a series of hollow fingers in communication with the manifold, each finger having a longitudinal series of perforations, means for creating a vacuum in said manifold and fingers to cause the sheet to adhere to the fingers, and means for temporarily breaking the vacuum when the fingers are in delivery position, said means for creating the vacuum including a valve assembly in communication with the manifold and adapted to control the exhaustion of air from the manifold, said valve assembly being adapted for connection to a vacuum pump, said means for temporarily breaking the vacuum comprising a cam mounted for continuous rotation upon the support structure, an arm engaging the cam and pivoted on the support structure so as to be swung at predetermined intervals during rotation of the cam, and a valve plunger connected to said arm and extending into the valve assembly, for operating the valve assembly between opposite extreme positions responsive to rising and falling, respectively, of the arm; a receiving table assembly on said support structure disposed in position to receive delivered sheets for stacking of the sheets on the delivery table assembly; a knife assembly on the support structure for cutting the web to produce said sheets, said knife assembly including a blade mounted on the support structure in a position extending transversely of and in closely spaced, overlying relation to the fly delivery mechanism in said retracted position of the fly delivery mechanism; and means on the support structure for driving the web-advancing assembly, the feed mechanism, the fly delivery mechanism, and the knife assembly, said means for driving the fly delivery mechanism including a driving connection with the cam adapted for effecting said continuous rotation of the cam, and further including a connection to said manifold adapted for oscillating the manifold at predetermined, timed intervals, said fingers radiating from the manifold so as to be swung in an oscillating movement between their retracted and delivery positions respectively, the means for oscillating the manifold including a cam mounted on the support structure for continuous rotation conjointly with the first cam, the second cam having a low side, an arm pivoted on the support structure in engagement with the second named cam, said arm being resiliently, yieldably biased in one direction and being free to move in said direction when in engagement with the low side of the second named cam, and a motion-translating connection between the second arm and said manifold adapted for translating swinging movement of said second arm into oscillating movement of the manifold.

References Cited in the file of this patent

UNITED STATES PATENTS

| | | |
|---|---|---|
| 1,640,768 | Gutherlet | Aug. 30, 1927 |
| 2,277,846 | Couch | Mar. 31, 1942 |
| 2,541,737 | Bardsley et al. | Feb. 13, 1951 |
| 2,688,356 | Conti | Sept. 7, 1954 |